(12) United States Patent
Odenheimer et al.

(10) Patent No.: US 11,023,487 B2
(45) Date of Patent: Jun. 1, 2021

(54) DATA REPLICATION FOR CLOUD BASED IN-MEMORY DATABASES

(71) Applicants: Jens Odenheimer, Karlsruhe (DE); Markus Boehm, Ludwigshafen (DE)

(72) Inventors: Jens Odenheimer, Karlsruhe (DE); Markus Boehm, Ludwigshafen (DE)

(73) Assignee: SAP SE, Walldorf (DE)

( * ) Notice: Subject to any disclaimer, the term of this patent is extended or adjusted under 35 U.S.C. 154(b) by 1351 days.

(21) Appl. No.: 13/783,763

(22) Filed: Mar. 4, 2013

(65) Prior Publication Data
US 2014/0250070 A1 Sep. 4, 2014

(51) Int. Cl.
*G06F 16/27* (2019.01)

(52) U.S. Cl.
CPC .................. *G06F 16/27* (2019.01)

(58) Field of Classification Search
CPC .............. G06F 16/27; G06F 3/0619
See application file for complete search history.

(56) References Cited

U.S. PATENT DOCUMENTS

| | | | | |
|---|---|---|---|---|
| 7,904,608 B2 * | 3/2011 | Price | G06F 8/65 | 710/10 |
| 8,260,761 B2 * | 9/2012 | Farrar | G06F 17/3056 | 707/705 |
| 8,285,681 B2 | 10/2012 | Prahlad et al. | | |
| 8,315,977 B2 * | 11/2012 | Anand | G06F 17/30578 | 707/610 |
| 8,327,029 B1 * | 12/2012 | Purser | H04N 21/4305 | 709/237 |
| 8,392,838 B2 | 3/2013 | Chawla et al. | | |
| 8,762,642 B2 * | 6/2014 | Bates et al. | | 711/118 |
| 8,838,529 B2 * | 9/2014 | Anglin | G06F 17/30575 | 707/609 |
| 2010/0199042 A1 | 8/2010 | Bates et al. | | |
| 2011/0022879 A1 * | 1/2011 | Chavda | G06F 11/0793 | 714/1 |
| 2011/0208808 A1 | 8/2011 | Corbett | | |
| 2011/0258461 A1 | 10/2011 | Bates | | |
| 2012/0042162 A1 | 2/2012 | Anglin et al. | | |
| 2012/0159421 A1 | 6/2012 | Driesen | | |
| 2012/0278815 A1 | 11/2012 | Balko | | |
| 2012/0281706 A1 * | 11/2012 | Agarwal et al. | | 370/395.53 |
| 2012/0297184 A1 | 11/2012 | Greer et al. | | |

(Continued)

*Primary Examiner* — Ashish Thomas
*Assistant Examiner* — Mellissa M. Ohba
(74) *Attorney, Agent, or Firm* — Sterne, Kessler, Goldstein & Fox P.L.L.C.

(57) ABSTRACT

System, method, and computer program product embodiments enable configuration of a recommended data replication strategy for cloud based in-memory databases. An embodiment operates by requesting, by a first computing device, configuration of an on-demand cloud-based in-memory database, assessing, at the first computing device, database system components, and transmitting database system component information from the first computing device to a second computing device over a network. The first computing device receives from the second computing device an evaluation of the database system components and a recommended replication strategy responsive to a replication rule set. The database system components at the first computing device are then configured to use the recommended replication strategy.

21 Claims, 5 Drawing Sheets

(56) References Cited

U.S. PATENT DOCUMENTS

| | | |
|---|---|---|
| 2012/0324069 A1 | 12/2012 | Nori et al. |
| 2013/0054523 A1 | 2/2013 | Anglin et al. |
| 2013/0085810 A1 | 4/2013 | Driesen et al. |
| 2013/0138473 A1 | 5/2013 | Balko et al. |
| 2013/0159285 A1 | 6/2013 | Dees et al. |
| 2013/0204849 A1 | 8/2013 | Chacko |

* cited by examiner

DATA REPLICATION FOR CLOUD BASED IN-MEMORY DATABASES

BACKGROUND

Database systems rely upon data replication to update and synchronize data within a database to ensure that changes performed on the data are reflected in copies of the data. Traditionally, data in a database is replicated according to a pre-set strategy. As databases transition from being stored locally to services provided on demand being wholly or partially cloud-based and stored remotely, in possibly unknown locations, traditional database replication methodologies may be impractical. Local database replication is often costly and overly complex, particularly with the growth of cloud-based databases. In addition, some data replication technologies are often not technically or legally compatible with certain database systems. Therefore, data replication of database systems is ripe for improvement.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for data replication for cloud based in-memory databases.

A database system is only as useful and valuable as the data which is stored in the database. Data in a database is traditionally replicated to a copy of the database and then the copy is updated as the data changes. Conventionally, a particular replication technology was "hard-wired" to a database and only a pre-set replication technology could be used to replicate a database.

Conventional methods of replicating data in a database are limiting, particularly in view of on-demand cloud based in-memory databases which are proliferating. Use of on-demand cloud based in-memory databases involves replication of data to the on-demand cloud based in-memory databases, which may result in inefficiencies. According to example embodiments, a database offered as a service, e.g. a cloud based database, may be replicated using a suggested approach which is optimal for a customer by taking a customer's particular database system architecture into consideration. As an example, a customer need not replicate using a cloud-based replication technology if an on premise option is available to the customer. A replication topology may be automatically suggested and instantiated based on an optimal methodology which may be most efficient for a customer.

Therefore, a replication technology need not be "hard-wired" to a database, and a customer may use an optimized replication technology which could provide a best performance and/or price for the customer. Depending on what is determined to be best for a customer, a cloud-based in-memory database may be replicated using a customer's on premise replication technology or a cloud-based in-memory database may be replicated using a cloud based replication technology.

Example Block Diagram of Replication Architecture

Figure 1:
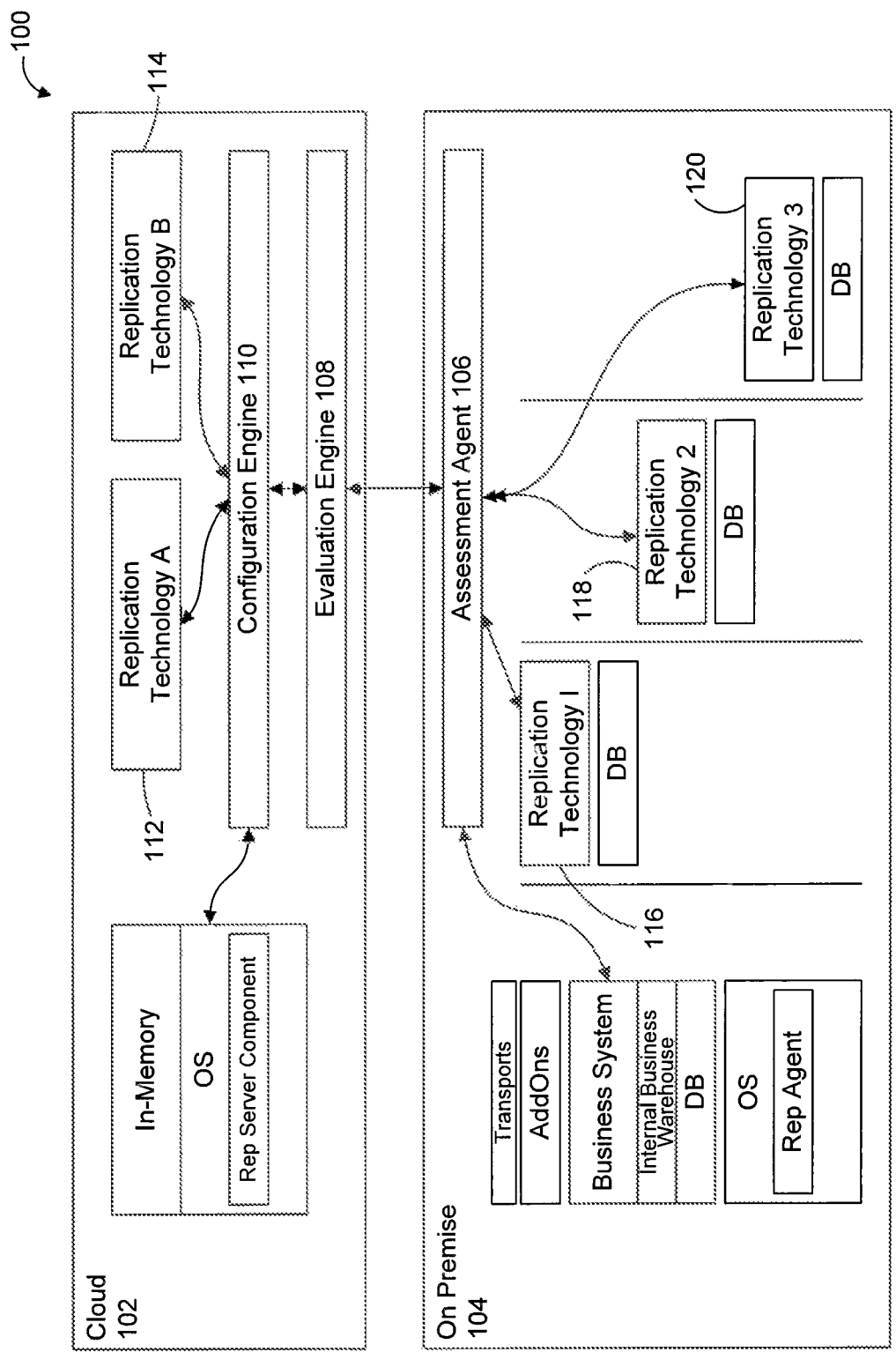
FIG. 1 is a block diagram of a database system that includes on premise system components as well as cloud-based system components, according to an example embodiment.

FIG. 1 shows a block diagram of a database system 100 according to an example embodiment. The database system 100 may be, but is not limited to an in-memory database system. The database system 100 is shown as having a cloud based component/computing device 102 and an on premise component/computing device 104. As shown in FIG. 1, the on premise component 104 may include a business system such as an Enterprise Resource Planning (ERP) system, and a plurality of replication technologies which may comprise a NetWeaver System Landscape Transformation (SLT) system, a DataServices server coupled with a Business Objects Server, and a Sybase Replication server, etc. However, the on premise component 104 is not limited to these examples and may include other business systems and replication technologies.

The on premise component 104 may be physically located at a customer's site and include an assessment agent 106. The assessment agent 106 is a software-based component and may be capable of determining features of a customer's data and system information related to hardware and software which are incorporated in the on premise component 104. Example information determined by the assessment agent 106 is shown in the table below.

| | System 1 | System 2 |
|---|---|---|
| Suite Component | ERP | CRM |
| Component Version | ECC 6.0 | CRM 7.1 |
| Component DB | Company A | Company B |
| Computer Hostname/SID | ABC | DEF |
| Computer Network Address | 127.2.3.4 | 192.5.6.7 |
| Replication Technology | Data Services | Data Services |
| Replication Technology Version | 3.1 | |
| Replication Technology Hostname | dssserver.company.biz | |
| Replication Technology Network Address | 127.2.3.99 | |

As shown in the table, the on premise component 104 may include two different business systems. A first system 1 may be an ERP system running ERP Central Component (ECC) 6.0 having a Company A based database. The hostname of the system 1 may be "ABC" and a computer of the system 1 may have a network address or an IP address of 127.2.3.4. In addition, a second system 2 may be a Customer Relationship Management (CRM) system running CRM 7.1 having a Company B based database. The hostname of the system 2 may be "DEF" and a computer of the system 2 may have a network address or an IP address of 192.5.6.7. In addition, the system 1 may utilize a Replication Technology having a version of 3.1. The Replication Technology may have a hostname of "dsserver.company.biz" with a network address or an IP address of 127.2.3.99. Regarding the system 2, the replication technology may not be currently set up at the on premise component 104.

According to an embodiment, a customer may be able to connect both of these business systems to a cloud-based in-memory database and determine whether to utilize cloud-based data replication technologies or on premise data replication technologies.

The assessment agent 106 located at the on premise component 104 may send information regarding each of the two different business systems to an evaluation engine 108 at the cloud based component 102 which may be remotely located from the on premise component 104. The evaluation engine 108 combines the gathered data and processes the gathered data according to a given rule set. The rule set may indicate which replication technologies are incompatible with particular types of database systems. The rule set may be used to determine whether to favor use of a replication technology, particularly if it is already in use at a customer's on premise location. If a replication technology is found to be in use at a customer's on premise location, then the evaluation engine 108 may likely recommend continued use of such replication technology unless there is a particular restriction which would prevent its use. As an example, a rule may include the following: If a source database is provided by vendor A, then Replication Technology B may not be used. In addition, a rule may include the following: If Replication Technology 1 is used, only a maximum of four database components may be used. Other restrictions could be related to technical issues, legal issues, etc. A rule set may be similar to the following example rule set:

|  | Replication Technology 1 | Replication Technology 2 |
| --- | --- | --- |
| Max # of Components | 4 | No maximum |
| ERP | Yes | Yes |
| CRM | Yes | No |
| SRM | No | No |
| Source DB | Company A, Company C | Company B |
| HTTP | Yes | Yes |
| RFC | No | No |
| ODBC | No | Yes |
| . . . | . . . | . . . |

Thus, according to an embodiment, the evaluation engine 108 may evaluate the asset data from the assessment agent 106 and analyze the data in view of the rule set. The evaluation engine 108 may provide as output a recommendation. As an example, an on premise data service may be chosen as a recommended replication technology.

According to an embodiment, configuration engine 110 may be located at the cloud based component 102 and use the recommendation from the evaluation engine 108. The configuration engine 110 may take the recommendation and configure components in order to utilize a particular replication technology or technologies. The configuration engine 110 may use both the on premise information provided by the assessment agent 106 and also use cloud configuration information, e.g. on demand asset data including a number of in-memory database systems, types of replication technologies available, etc. Cloud configuration information may include data similar to the data provided in the example table below:

|  | In-Memory Database Technology | Replication Technology 1 | Replication Technology 2 |
| --- | --- | --- | --- |
| Technology Name | In-Memory Direct Extractor Connection | SLT | Data Services oD |
| Component Version | 1.04 | 7.1 | 3.1 |
| Computer Network Address | 127.2.3.4 | 192.5.6.7 | N/A |
| # of Attached Systems | 3 | 2 | 1 |

Thus, the configuration engine 110 is able to provide configuration templates and attach systems in order to replicate data in using a technology that is determined to be best for a customer. As an example, an on premise data services server may be coupled with a cloud based model repository for cloud based data services using on demand replication. As shown in FIG. 1, the cloud based component 102 includes Replication Technology A 112 and Replication Technology B 114. The on premise component 104 includes Replication Technology 1 116, Replication Technology 2 118, and Replication Technology 3 120. One of these replication technologies may be recommended and configured for use according to example embodiments provided herein.

Example Replication Recommendation

Figure 2:
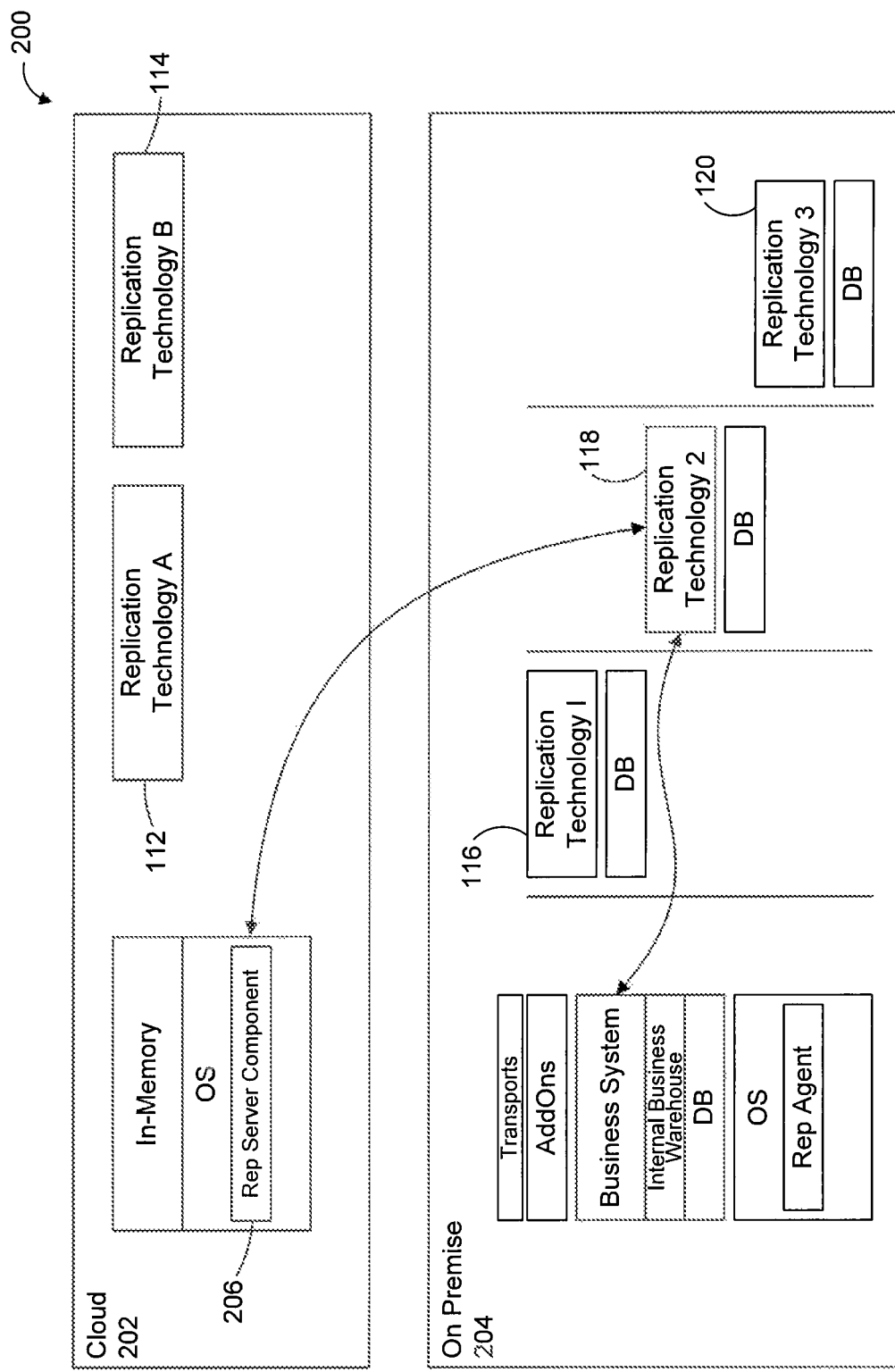
FIG. 2 is a block diagram showing system components involved in a database replication recommendation, according to an example embodiment.

FIG. 2 shows a block diagram of components of a possible database replication recommendation 200 as provided by configuration engine 110, according to an example embodiment. As shown in FIG. 2, a database system may include a cloud based component 202 as well as an on premise component 204. FIG. 2 shows that a Replication Technology 2 118 may be configured to communicate with a replication server component 206 which is located at the cloud based component 202 as well as a business system located at the on premise component 204. In this example, there are two replication technologies available for use (Replication Technology A 112 and Replication Technology B 114) in the cloud based component 202 and three replication technologies available for use in the on premise component 204 (Replication Technology 1 116, Replication Technology 2 118, and Replication Technology 3 120).

As shown in FIG. 2, the recommendation is to use an on premise replication technology, Replication Technology 2 118, and replicate to the cloud based replication server component 206 which is provided by an in-memory cloud-based database system. In this instance, according to the recommendation, it was determined that an on premise replication strategy would have been most efficient and/or cost effective for the customer. However, in other instances, it may be desirable to replicate to the cloud based in-memory database using a cloud-based replication strategy. Thus, the example embodiments allow a customer to receive a most effective recommendation based on a customer's on premise data and architecture and configure replication technologies appropriately. A recommendation may be (a) use on premise replication technology only, (b) use cloud based replication technology only or (c) use both on premise replication technology and cloud based replication technology without being limited to a "hard-wired" replication approach.

Detailed Block Diagram of Replication Architecture

Figure 3:
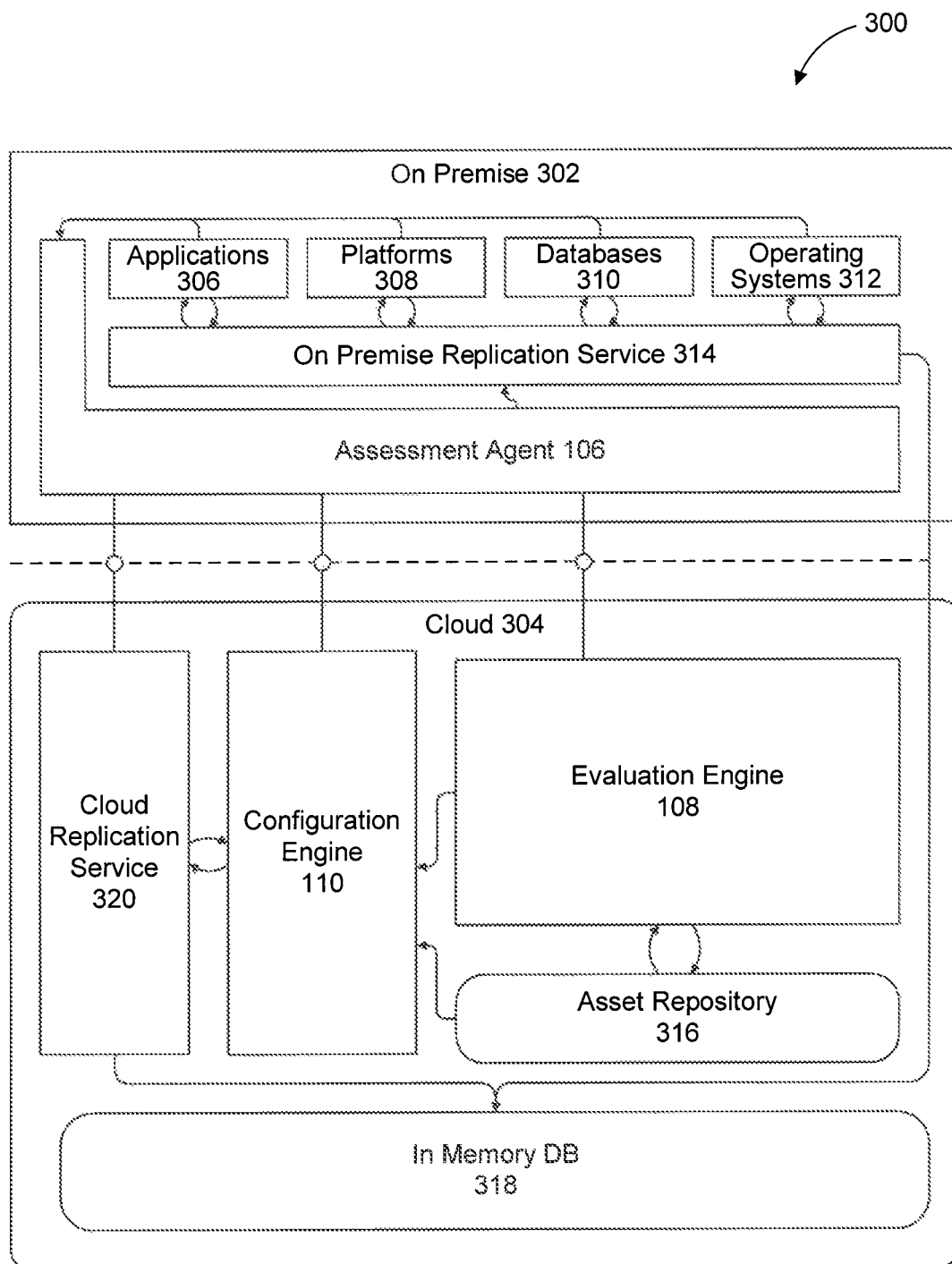
FIG. 3 is a more detailed block diagram of a database system that includes on-premise system components as well as cloud-based system components, according to an example embodiment.

FIG. 3 shows a more detailed block diagram of an on premise/cloud data replication architecture 300, according to an example embodiment. As shown in FIG. 3, there may be both on premise replication technologies as well as cloud based replication technologies, e.g. on-demand replication technologies. However, according to an example embodiment, a customer may not have the option of using on premise replication technology. In that case, a customer may be configured to use an on-demand cloud based replication technology.

FIG. 3 shows an on premise component 302 as well as a cloud based component 304. The on premise component 302 may include applications 306, platforms 308, databases 310 and operating systems 312 which are in communication with an on premise replication service 314. This on premise replication service 314 may be in communication with the assessment agent 106. The assessment agent 106 may communicate with the cloud based component 304 using hypertext transfer protocol secure (HTTPS), a remote function call (RFC), open database connectivity (ODBC), Java database connectivity (JDBC), etc. The on premise agent 302 may also communicate with the cloud based component 304 in other appropriate ways and is not limited to using these examples.

The cloud based component 304 may include evaluation engine 108 as well as configuration engine 110. The cloud based component may also include an asset repository 316, an in memory database 318 and a cloud replication service 320.

Example Process

Figure 4:
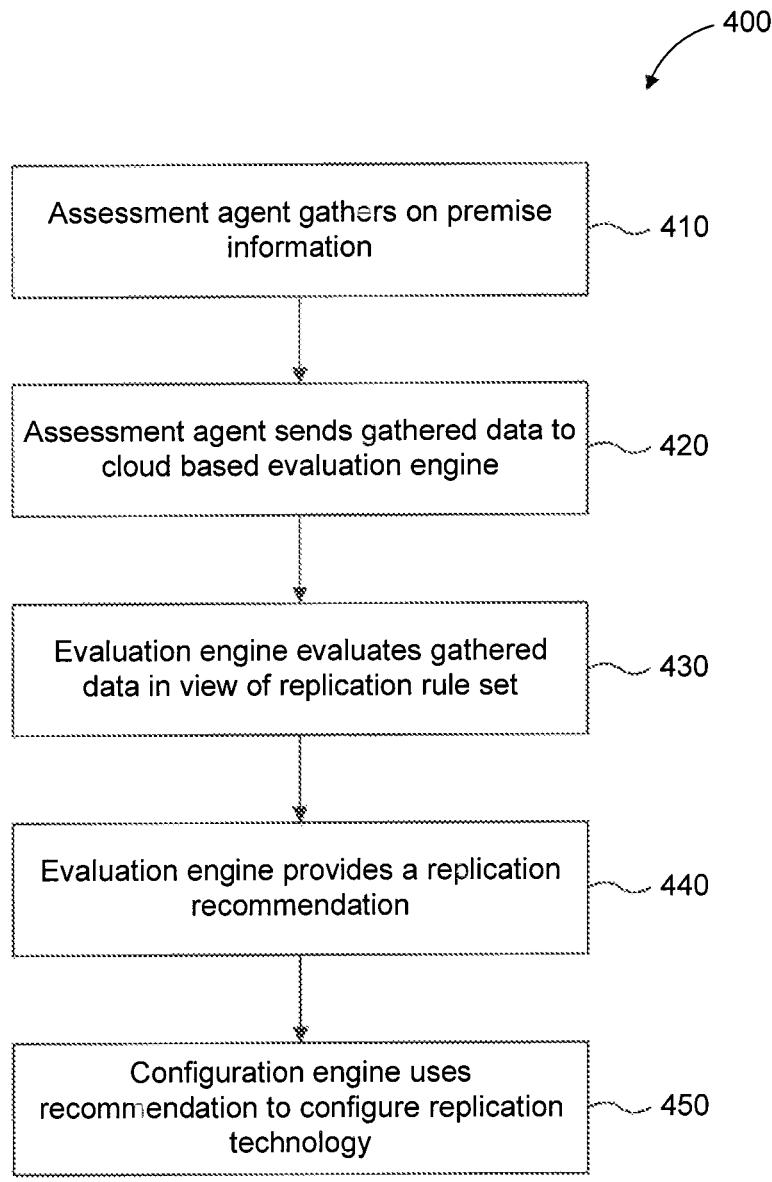
FIG. 4 is a flowchart illustrating a process of data replication, according to an example embodiment.

According to an embodiment, FIG. 4 shows a flowchart 400 illustrating a process of data replication using a recommendation. In step 410, upon receipt of a request to configure an on-demand cloud-based in memory database, an assessment agent at an on premise customer site may gather information based on a customer's database system components and architecture, e.g. on premise asset data. As provided above, this information may include database system component information such as suite component metadata including a component type, a component version, a database provider, a computer hostname, a network address, and any available replication technology information.

In step 420, the assessment agent may send the gathered information to a cloud based evaluation engine over a network.

In step 430, the evaluation engine may evaluate the customer's system components and architecture in view of a replication technology rule set to determine compatibility between the customer's system components and available replication technologies. For example, it may be determined whether an on premise replication technology is in use or whether a cloud based replication technology is compatible with an on premise database. As noted above, if an on premise replication technology is in use, the evaluation engine will likely recommend continued use of the on premise technology unless there is a restriction.

In step 440, the evaluation engine may use both the on premise information and cloud based information in order to provide a replication recommendation which will provide a customer with a best way of replicating a database by taking factors such as performance and price into consideration.

In step 450, a configuration engine may utilize the recommendation from the evaluation engine and configure a replication strategy using on premise replication technology or cloud based replication technology.

According to example embodiments, as provided in flowchart 400, a system may analyze a customer's on premise replication assets and provide an automated process for choosing an optimal replication technology or technologies for the customer. A purely cloud based data integration solution may neglect potential replication assets that a customer may have already established. Thus, if a customer operates a data services server on premise which provides efficient replication strategies, additional cloud services may not be needed. According to the example embodiments, the methods and systems described herein are able to best determine an optimal replication system and methodology for a customer's unique database system hardware and software architecture.

Example Computer System

Figure 5:
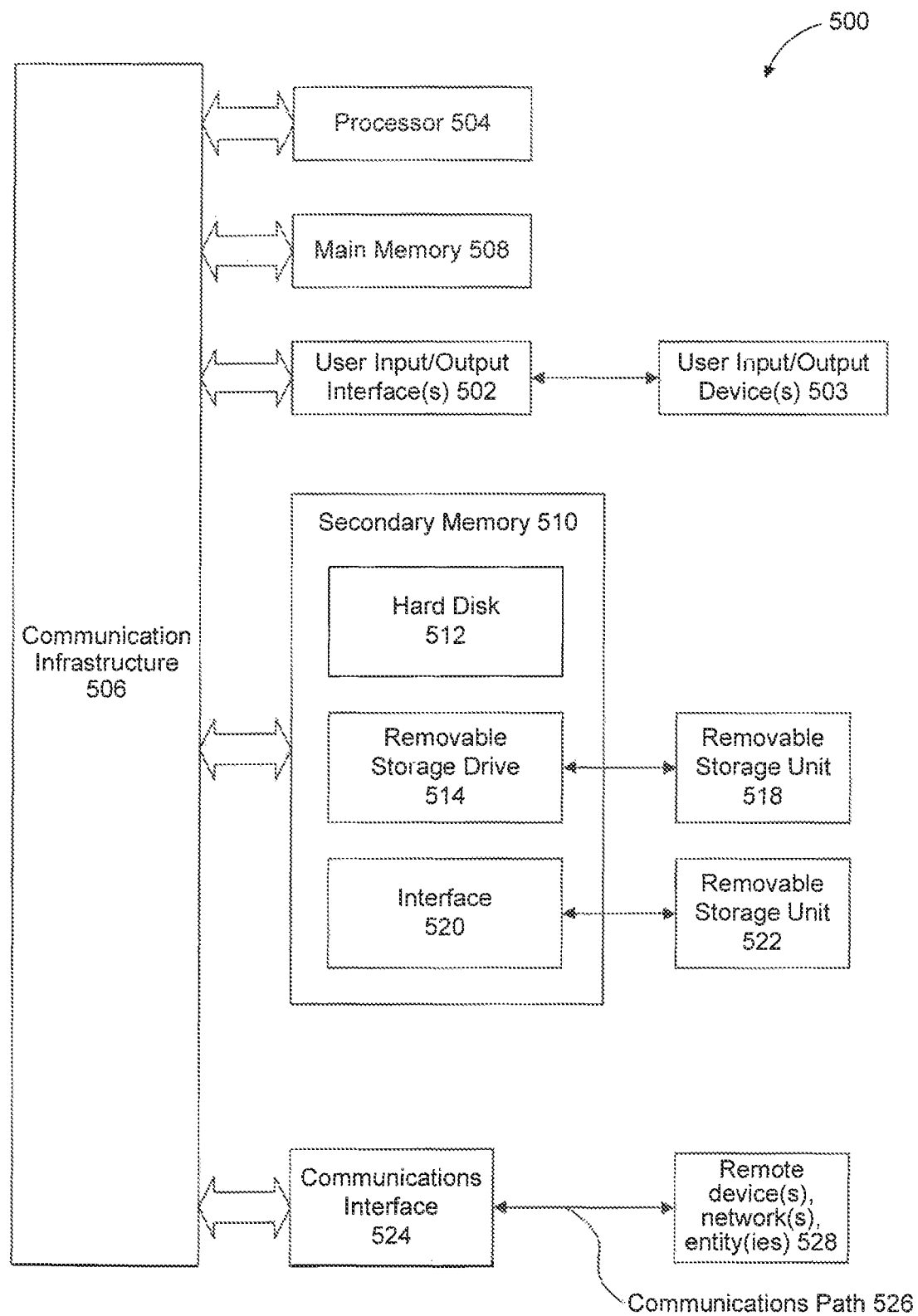
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all contemplated exemplary embodiments of the disclosure, and thus are not intended to limit the scope of the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method comprising:
receiving, by a first computing device, a request to configure an on-demand cloud-based in-memory database, wherein the on-demand cloud-based in-memory database is provided by a second computing device, and wherein the on-demand cloud-based in-memory database is configured to replicate data of a database operating on the first computing device;
determining, at the first computing device, features comprising identification information that identifies database system software operating on the first computing device, wherein the identification information is independent of the data to be replicated;
transmitting, from the first computing device, the identification information to the second computing device, wherein the second computing device is configured to evaluate the identification information against compatibility information of a replication rule set to generate a recommendation indicating replication technology, selected from a plurality of available replication technologies identified by the second computing device, used to replicate the data from the first computing device to the on-demand cloud-based in-memory database;
receiving, at the first computing device, the recommendation from the second computing device; and
configuring, by the first computing device, the database system software operating on the first computing device to use the replication technology indicated by the recommendation, to replicate the data of the database operating on the first computing device to the on-demand cloud-based in-memory database provided by the second computing device.

2. The method of claim 1,
wherein the replication technology indicated by the recommendation is a cloud-based replication technology provided by the second computing device.

3. The method of claim 1,
wherein the replication technology indicated by the recommendation is an on-premise replication technology provided by the first computing device.

4. The method of claim 1, wherein the recommendation is generated by an evaluation engine, based on input from an assessment agent, wherein at least one of the evaluation engine and assessment agent are communicatively coupled with at least the second computing device.

5. The method of claim 1, wherein the replication rule set comprises restrictions associated with each replication technology of the plurality of replication technologies, and wherein the recommendation is determined based on whether the features of the database system software are compatible with restrictions of the replication technology from the plurality of replication technologies, and wherein the features identify a software or a hardware architecture of the database system software.

6. The method of claim 1, wherein the determined features of the database system software comprise a database suite component, a component version, a component database vendor, a computer hostname, and a computer network address.

7. The method of claim 1, wherein the replication rule set comprises restrictions based on a number of database components, on-premise component availability, enterprise resource planning, customer relationship management, supplier relationship management, a source database type, a data compression type, and database protocols.

8. A system, comprising:
a memory; and
at least one processor coupled to the memory and configured to:
receive, by a first computing device, a request to configure an on-demand cloud-based in-memory database, wherein the on-demand cloud-based in-memory database is provided by a second computing device, and wherein the on-demand cloud-based in-memory database is configured to replicate data of a database operating on the first computing device;
determine, at the first computing device, features comprising identification information that identifies database system software operating on the first computing device, wherein the identification information is independent of the data to be replicated;
transmit, from the first computing device, the identification information to the second computing device, wherein the second computing device is configured to evaluate the identification information against compatibility information of a replication rule set to generate a recommendation indicating replication technology, selected from a plurality of available replication technologies identified by the second computing device, used to replicate the data from the first computing device to the on-demand cloud-based in-memory database;
receive at the first computing device from the second computing device the recommendation; and
configure, by the first computing device, the database system software operating on the first computing device to use the replication technology indicated by the recommendation to replicate the data of the database operating on the first computing device to the on-demand cloud-based in-memory database provided by the second computing device.

9. The system of claim 8, wherein the replication technology is a cloud based replication technology provided by the second computing device.

10. The system of claim 8, wherein the replication technology is an on premise replication technology provided by the first computing device.

11. The system of claim 8, wherein the recommendation is generated by an evaluation engine, based on input from an assessment agent, wherein at least one of the evaluation engine and assessment agent are communicatively coupled with at least the second computing device.

12. The system of claim 8, wherein the replication rule set comprises restrictions associated with each replication technology of the plurality of replication technologies, and wherein the recommendation is determined based on whether the features of the database system software are compatible with restrictions of the replication technology from the plurality of replication technologies, and wherein the features identify a software or a hardware architecture of the database system software.

13. The system of claim 8, wherein the determined features of the database system software comprise a database suite component, a component version, a component database vendor, a computer hostname, and a computer network address.

14. The system of claim 8, wherein the replication rule set comprises restrictions based on a number of database components, on-premise component availability, enterprise resource planning, customer relationship management, supplier relationship management, a source database type, a data compression type, and database protocols.

15. A tangible computer-readable device having instructions stored thereon that, when executed by at least one computing device, causes the at least one computing device to perform operations comprising:
receiving, by a first computing device, a request to configure an on-demand cloud-based in-memory database, wherein the on-demand cloud-based in-memory database is provided by a second computing device, and wherein the on-demand cloud-based in-memory database is configured to replicate data of a database operating on the first computing device;
determining, at the first computing device, features comprising identification information that identifies database system software operating on the first computing device, wherein the identification information is independent of the data to be replicated;
transmitting, from the first computing device, the identification information to the second computing device, wherein the second computing device is configured to evaluate the identification information against compatibility information of a replication rule set to generate a recommendation indicating replication technology, selected from a plurality of available replication technologies identified by the second computing device, used to replicate the data from the first computing device to the on-demand cloud-based in-memory database;
receiving, at the first computing device, the recommendation from the second computing device; and
configuring, by the first computing device, the database system software operating on the first computing device to use the replication technology indicated by the recommendation to replicate the data of the database operating on the first computing device to the on-demand cloud-based in-memory database provided by the second computing device.

16. The computer-readable device of claim 15, wherein the replication technology is a cloud-based replication technology provided by the second computing device.

17. The computer-readable device of claim 15, wherein the replication technology is an on-premise replication technology provided by the first computing device.

18. The computer-readable device of claim 15, wherein the recommendation is generated by an evaluation engine, based on input from an assessment agent, wherein at least one of the evaluation engine and assessment agent are communicatively coupled with at least the second computing device.

19. The computer-readable device of claim 15, wherein the replication rule set comprises restrictions associated with each replication technology of the plurality of replication technologies, and wherein the recommendation is determined based on whether the features of the database system software are compatible with restrictions of the replication technology from the plurality of replication technologies, and wherein the features identify a software or a hardware architecture of the database system software.

20. The computer-readable device of claim 15, wherein the determined features of the database system software comprise a database suite component, a component version, a component database vendor, a computer hostname and a computer network address and wherein the replication rule set comprises restrictions based on a number of database components, on-premise component availability, enterprise resource planning, customer relationship management, supplier relationship management, a source database type, a data compression type, and database protocols.

21. A method, comprising:
   receiving, by a second computing device, a request, from a first computing device, to configure an on-demand cloud-based in-memory database, wherein the on-demand cloud-based in-memory database is provided by the second computing device, and wherein the on-demand cloud-based in-memory database is configured to replicate data of a database system software operating on the first computing device;
   receiving, by the second computing device, features comprising information that identifies database system software operating on the first computing device, wherein the identification information is independent of the data to be replicated;
   identifying, by the second computing device, a plurality of replication technologies used to replicate the data from the first computing device to the on-demand cloud-based in-memory database;
   evaluating, by the second computing device, the indicated features against a replication rule set to generate a recommendation indicating replication technology, selected from the plurality of available replication technologies, used to replicate the data of the database operating on the first computing device to the on-demand cloud-based in-memory database provided by the second computing device;
   configuring, by the second computing device, the on-demand cloud-based in-memory database provided by the second computing device to use the replication technology indicated by the recommendation, to replicate the data from the database operating on the first computing device.

\* \* \* \* \*